United States Patent
Disse et al.

(10) Patent No.: US 6,890,645 B2
(45) Date of Patent: May 10, 2005

(54) PHOTOCATALYTIC SHEET OR FILM AND ITS MANUFACTURING PROCESS

(75) Inventors: Leo Disse, Teteringen (NL); Yuzo Toda, Goirle (NL); Seimi Satake, Tilburg (NL); Huub Gillissen, Berkel-Enschot (NL)

(73) Assignee: Fuji Photo Film B.V., Tilburg (NL)

( * ) Notice: Subject to any disclaimer, the term of this patent is extended or adjusted under 35 U.S.C. 154(b) by 0 days.

(21) Appl. No.: 10/311,797

(22) PCT Filed: Jun. 19, 2001

(86) PCT No.: PCT/NL01/00459

§ 371 (c)(1),
(2), (4) Date: Mar. 4, 2003

(87) PCT Pub. No.: WO01/97970

PCT Pub. Date: Dec. 27, 2001

(65) Prior Publication Data

US 2003/0165702 A1 Sep. 4, 2003

(30) Foreign Application Priority Data

Jun. 21, 2000 (EP) ............................................ 00202165

(51) Int. Cl.⁷ ................................................ B32B 5/16
(52) U.S. Cl. ...................... 428/323; 428/328; 428/329; 428/330; 428/331; 428/336; 428/913
(58) Field of Search ................................ 428/323, 336, 428/328, 329, 330, 331, 913

(56) References Cited

U.S. PATENT DOCUMENTS 6,013,372 A * 1/2000 Hayakawa et al. ...... 428/411.1
6,455,465 B1 * 9/2002 Miyasaka ................... 502/350
6,537,379 B1 * 3/2003 Vajo et al. ..................... 134/2
6,680,135 B2 * 1/2004 Boire et al. ................. 428/702

FOREIGN PATENT DOCUMENTS

| | | |
|---|---|---|
| EP | 0 925 832 A1 | 6/1998 |
| EP | 0 846 494 A1 | 6/1999 |
| JP | 7-171408 A | 7/1995 |
| JP | 10-128125 | 5/1998 |
| JP | 11-47610 A | 2/1999 |
| JP | 11-117194 A | 4/1999 |
| JP | 11117194 A * | 4/1999 |
| JP | 11-117196 A | 4/1999 |
| JP | 11-268163 A | 10/1999 |
| JP | 11-279446 A | 10/1999 |

OTHER PUBLICATIONS

XP 002150747, filed Oct. 1999, Database WPI.

* cited by examiner

Primary Examiner—H. Thi Le
(74) Attorney, Agent, or Firm—Banner & Witcoff, Ltd.

(57) ABSTRACT

The invention is directed to a photocatalytic sheet comprising a support, a photocalalytic layer comprising photocatalyst materials and binder, and at least one functional layer wherein said functional layer is in between said support and said photocatalytic layer, wherein said photocatalytic layer and said functional layer are brought on the support using extrusion coating technology or casting technology, as well as to a photocatalytic film sheet comprising: a photocatalytic layer comprising photocatalyst materials and binder, and at least one functional layer, wherein said film is formed by applying casting technology.

38 Claims, 1 Drawing Sheet

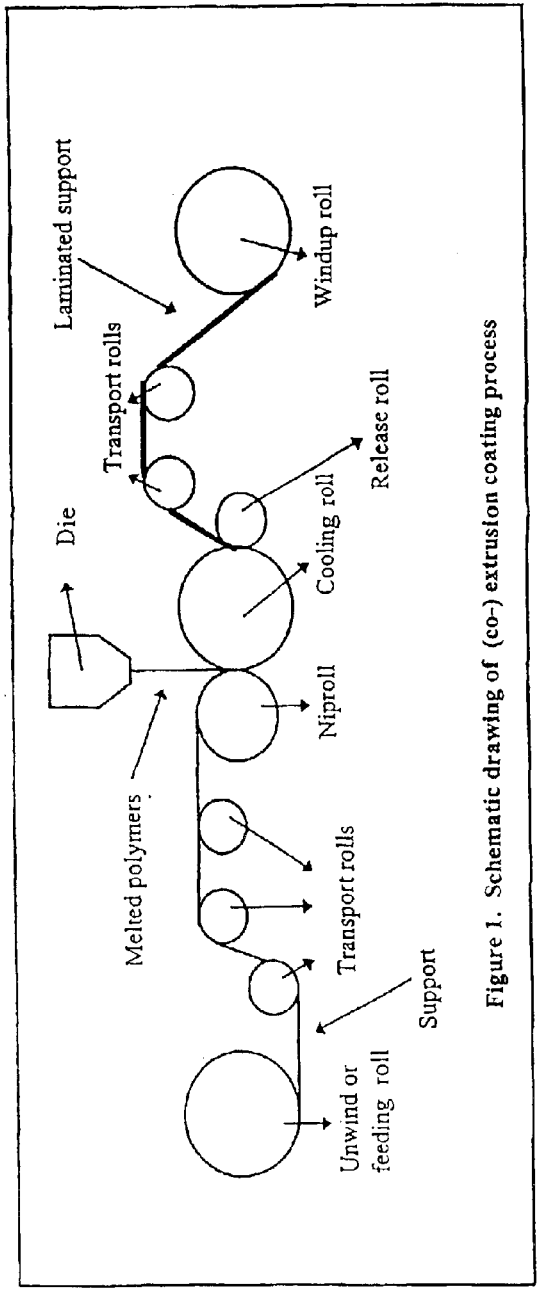
Figure 1. Schematic drawing of (co-) extrusion coating process
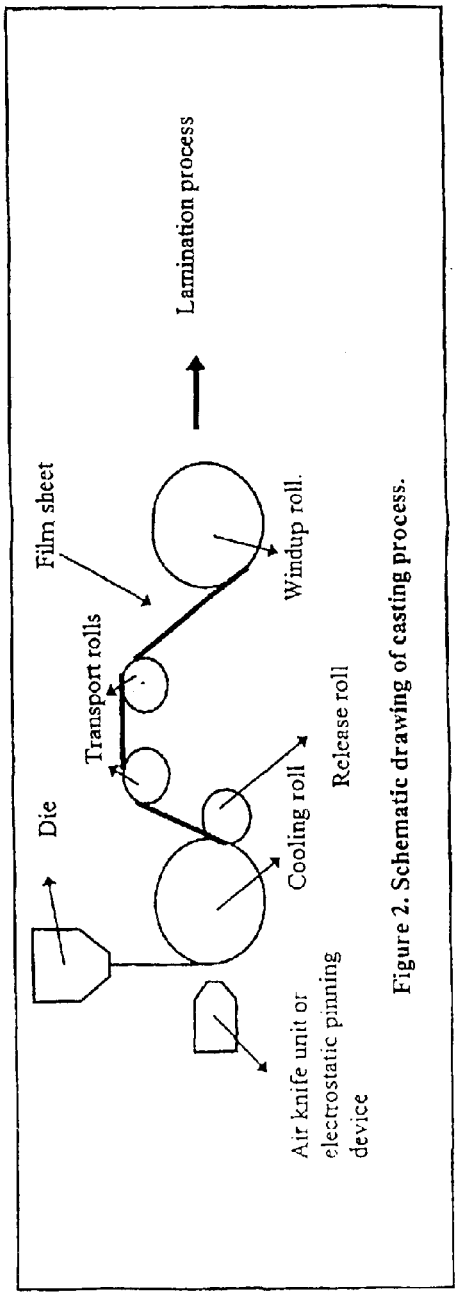
Figure 2. Schematic drawing of casting process.

PHOTOCATALYTIC SHEET OR FILM AND ITS MANUFACTURING PROCESS

FIELD OF INVENTION

The present invention is directed to the process for manufacturing a photocatalytic sheet by using the extrusion coating technology.

BACKGROUND OF THE INVENTION

Recently there has been a lot of patents filed where the production and use of a photocatalytic coating containing a photocatalyst material such as titania ($TiO_2$) is described. The said photocatalytic coating find its application in various field of technology, such as in the anti-fouling area [US 6013372] and in antibacterial applications [JP 11047610].

When a photocatalyst, such as titanium dioxide, is subjected to photoexcitation by ultraviolet light (UV), water is chemisorbed on the surface of the titanium ion in the form of hydroxyl groups (OH—) as a result of the photocatalytic action. As a result, the surface of the material coated with $TiO_2$ becomes very much hydrophilic. Due to said properties, a transparent film containing photocatalytic layer can be used as anti fogging material [US 6013372].

Another suggestion on the mechanism of photocatalytic action is the formation of activated oxygen from water or oxygen in the air when $TiO_2$ captures UV light. This process is similar to photosynthesis, in which chlorophyll captures sunlight to turn water and carbon-dioxide into oxygen and glucose. This activated oxygen has the ability to decompose organic substances and micro-organism which are present near to the surface of the material that is coated with $TiO_2$. As a result, the surface which is covered by photocatalytic particles has antibacterial or disinfecting properties [JP 11047610]. Since the activated oxygen has the affinity to decompose organic substances, it can also be applied in a deodorising agent. By coating an aqueous dispersion containing photocatalytic particles and binder on a base paper, one can produce deodorising paper suitable to be used in air cleaner or for other gas streams [JP 11279446, JP 11117196].

The most important property of a photocatalyst material is that upon light radiation with an energy that is higher than the valence band of the photocatalyst material, an electron and an electron-hole will be generated by excitation. The excited electron reacts with oxygen and will decompose the surrounding polymers and other organic materials that have a lower bonding energy than the valence energy of the photocatalyst material by oxidation reaction. AB an example, when $TiO_2$ is irradiated with UV light, decomposition of the surrounding polyolefin resin or cellulose will occur. However poly-fluoro-carbon resin will not be decomposed since the bonding energy of C-F is higher than the valence band of $TiO_2$. It is thus of importance to select a suitable material for being used as binder for the photocatalytic layer. Examples of suitable binders for $TiO_2$ are organic polymers containing fluorocarbon and/or inorganic materials like silica oxide.

The conventional method to produce a sheet containing photocatalysts is by coating an aqueous dispersion containing photocatalyst particles, inorganic binder, like colloidal silica or silicone resin, and organic binder, such as a thermoplastic polymer having a high deterioration resistance—polytetrafluoroethylene—on a film or paper. After drying the coating solution, the coated paper is ready for cutting and packaging. This method is suggested among others in JP 11279446, JP 11117196, JP 10128125.

In JP 11117194, it was proposed to coat the paper with a UV absorbing layer, followed by coating said layer with a photocatalyst containing layer that contains expandable microcapsules, and then drying the coating by heating. Due to the heat, the microcapsules will expand and create specific desirable surface areas.

Generally, in order to manufacture photocatalytic film sheets on a support, the layer comprising a polymer with a lower bonding energy than the valence band of the photocatalytic material, should be protected from a direct contact with the photocatalytic material. For this purpose, a protective layer comprising polymer compounds with a high bonding energy than that of the photocatalytic layer, are applied on the support. Thereafter a dispersion solution containing photocatalyst material, binder and inorganic material are coated on the surface of said protective layer. The common techniques to apply said protective and photocatalyst layers on the support are the coating or spraying methodologies such as dip coating, spin coating, wire bar coating, blade coating, roller-coating, spray coating [JP 07171408].

The combination of the coating, drying and optional baking processes, which is described in JP 11047610, is known to be slow. As a result, the production speed becomes low. The more drying and baling steps needed, the slower the production speed will be. Another disadvantage of this process is that it costs relatively a lot of energy because first of all the photocatalytic particles have to be dispersed uniformly in the coating solution and secondly evaporating the solvent after coating in the drying or baling step.

It would be desirable if the photocatalytic film sheet could be manufactured at a high production speed and without any necessity for drying or baking processes.

Problem to be Solved by the Invention

There remains a need for a high speed manufacturing process for a photocatalyst material that is attached to a support and for a photocatalyst film sheet.

SUMMARY OF THE INVENTION

The object of the present invention is to provide a process for manufacturing a photocatalytic sheet at high production speeds.

It is also an important object of the invention to eliminate the drying process during manufacturing of said photocatalytic sheet.

Another object of this invention is to manufacture the photocatalytic sheet with extrusion coating technology or by casting technology and followed by the lamination process. Herein it is included that the manufacturing process for a photocatalytic film sheet is applied by casting technology only.

A future object of the invention is to concentrate the active photocatalyst materials in the most upper layer of the photocatalytic (film) sheet, the so called skin layer. It is preferable to have the skin layer as thin as possible.

Still another object of the invention is to use binders, next to the photocatalytic material, in the skin layer which are resistant for deterioration when the photocatalyst is irradiated by UV light.

The present invention is based on the extrusion coating technology wherein mixtures of fine photocatalyst particles-either as raw material or as a solid dispersion in a polymer resins which is well known as master batch- and binder are heated, extruded on the support such as a paper or a polymer film and cooled down by pressing a cooling roll on the extruded support. This technology is not restricted to one layer extrusion at a time. It is possible to extrude 2, 3 or more layers together in a so called co-extrusion method. Another process variation, which is also within the area of this invention, is to apply the casting technology which is followed optionally by the lamination process to produce said photocatalytic sheet.

According to the present invention, there is provided a photocatalytic sheet comprising (A) a support, (B) a photocatalytic layer comprising photocatalyst particles and binder, C) at least one functional layer wherein said functional layer is in between said support and said photocatalytic layer, and optionally (D) a polymer resin layer which is introduced between said support and said functional layer, comprising polymer resins and adhesion promoter additives, and wherein said photocatalytic layer, functional layer and said polymer resin layer are brought onto the support by extrusion coating technology or a combination of casting and lamination process.

Also according to the present invention, there is provided a photocatalytic film comprising (A) a photocatalytic layer comprising photocatalyst materials and binder, and (B) at least one functional layer, wherein said film is produced by casting technology.

DETAILED DESCRIPTION

The present invention relates, in the broadest sense, of applying extrusion coating technology, casting technology or the combination of casting and lamination process for producing both photocatalytic sheet and photocatalytic film.

The advantage of this technique is that we do not need to dissolve polymer resin, nor the photocatalyst material binder and inorganic material in water or other solvents prior to extrusion or casting. We neither need to dry the photocatalytic (film) sheet after extrusion process since we do not use any solvent. As a result, high production speed and an environment friendly manufacturing method for the photocatalytic (film) sheet is achieved.

The photocatalytic sheet according to the invention consist of a support, photocatalytic layer and at least one fictional layer between the support and the photocatalytic layer. On the support, which material is selected from paper, or cellulose, or triacetylcellulose (TAC) or polyethyleneteraphtalate (PET), polyethylenenaphtalate (PEN), or polyamide or polypropylene other polymeric films, resides at least one functional layer. The said functional layer may have several different functions, such as (1) to provide protection to the layer underneath the functional layer from the photocatalyst which is present in the photocatalytic layer, (2) to provide a good adhesion between the layer underneath and the layer above this functional layer and (3) to provide additional features to the sheet such as addition of some colour, flame retarding properties. The said functional layer comprising of binder, polymer resin, filler, extenders, pigment, and optionally dye and adhesion promoter additives. On the top of the functional layer resides the photocatalytic layer comprising photocatalyst materials and binders.

In this invention we can optionally introduce one or more polymer resin layer between said support and said functional layers. The said polymer layer has two primary functions i.e. (1) to provide a good adhesion between the support and the functional layer and (2) to create a good condition for the co-extrusion process. By having the said polymer resin layer, the co-extrusion process becomes more easy to control and makes the production of photocatalytic sheet more manufacturable. In some cases it may be necessary to apply two polymer resin layers on the support to enhance the stability of manufacturing process and improve adhesion properties of the sheet.

The extrusion coating is preferably done by the co-extrusion methods, wherein the functional layer, optionally polymer resin layer and the photocatalytic layer are extruded at the same time on the support. The layer formation is arranged as such that the functional layer is positioned in between the support and the photocatalytic layer. In case a polymer resin layer is included, this layer is positioned in between the support and said functional layer.

The structures of the photocatalytic sheet of the invention are thus as follows:

| Photocatalytic | And | Photocatalytic |
| ............ | | ............ |
| Functional layer | | Functional layer |
| Support | | ............ |
| | | Polymer resin |
| | | Support |

In this invention we also apply casting technology in order to produce a photocatalytic film consisting of a photocatalytic layer and at least ne functional layer. As in the case of the extrusion coating, we optionally may have one or more polymer resin layer(s) too. Herein, the photocatalytic layer, the functional layer and optionally the polymer resin layer are melted and fed onto the cooling roll. The photocatalytic film has the following structure:

| Photocatalytic layer | And | Photocatalytic |
| ............ | | ............ |
| Functional layer | | Functional layer |
| | | ............ |
| | | Polymer resin |

It is still within the spirit of this invention to produce said photocatalytic sheet by, first of all, producing the photocatalytic film and then laminated said film on a support.

Both the co-extrusion as well as the casting techniques are especially suitable for manufacturing thin photocatalytic layer at a high production speed. The thickness of the photocatalytic layer is important for the effectiveness of the photocatalytic (film) sheet since only photocatalyst materials present on the surface will be effectively used by UV radiation. The thickness of the photocatalytic layer is between 0.1 to 5.0 $\mu$m, preferably between 0.1 $\mu$m to 2.0 $\mu$m and more preferably between 0.3 to 1.0 $\mu$m. The total thickness of the photocatalytic sheet, excluding the support, is at least 10 $\mu$m.

The extrusion coating can also be done by multiple extrusion, or combination of co-extrusion and single or multiple extrusion. In this case one or more polymer resin layer(s) and the photocatalytic layer can be extruded subsequently on the support. After each extrusion process, the surface of the polymer resin layer can be treated with corona treatment, ozone treatment, plasma treatment, flame treatment or coated with an adhesion promoter additives, which purpose is to improve the surface properties of the protective layer.

By combining single or multiple extrusion and co-extrusion, an enormous variations of the thickness and the amount of layers of photocatalytic layer and protective layer(s) can be achieved.

The advantage of the co-extrusion above multiple extrusion coating is that a thin and high concentrated photocatalytic layer can be extruded, especially at photocatalyst concentration higher than 10 wt %. Another advantage is that co-extrusion has wider process operation window compared to multiple extrusion. It is relatively more easy for co-extrusion process to control the adhesion between the layers.

In this invention, the suitable photocatalyst material is selected from the group consisting of $SrTiO_3$, $TiO_2$, ZnO, $SnO_2$, $WO_3$, $Fe_2O_3$ and $Bi_2O_3$. The preferred photocatalyst material is the anatase form of $TiO_2$.

The photocatalytic layer comprising of 10 wt % to 90 wt % of photocatalyst material and 90 wt % to 10 wt % binder having higher bonding energy than the photocatalyst. The effectiveness of photocatalytic material at concentration lower than 10 wt % is so low that it is regarded as not desired, whereas at concentration higher than 90 wt %, the extrusion and casting processes are expected to be unstable.

Preferably, the photocatalytic layer contains 20 wt % to 80 wt % of photocatalyst materials and 80 wt % to 20 wt % binder.

The organic binder for the photocatalytic layer is selected from any combination or mixture of monomers that is selected from the group of tetrafluoroethylene or vinylenedifluoro or hexafluoropropylene or perfluorovinylether or any other monomer containing fluorocarbon bonding.

The functional layer which provides, among others, protection to the polymer resin layer having a bonding energy lower than the valence band of the photocatalyst material, contains next to the said binder, also polymer resin and at least pigments and fillers or extenders. Depending on the additional function of the layer, we may optionally add other additives such as dye, adhesion promoter, matting agents, anti oxidant and processing aids. The purpose of the extender or filler materials is to increase the desired volume of the functional layer with a cheaper material than the binder. The amount of fillers in said functional layer lies between 5 wt % to 60 wt %. The fillers can be selected from silicious particles, calcium-carbonate, pigment grade TiO2, hydrated aluminium oxide and clay. The non-limiting examples of silicious particles are: silica, mica, montmorillonite, kaolinite, zeolites, aluminium polysilica, etceteras. The pigments can be selected from the inorganic pigments, the organic pigments or combination of it. Suitable inorganic pigments are the white pigments such as pigment grade TiO2, zinc oxide and zinc-sulphate, the iron oxide pigments, the ultramarine pigments, or the blue iron pigments. The suitable classes of organic pigments include azo pigments, metal-complex pigments such as copper phthalocyanine and higher polycyclic compounds such as anthraquinone, isoindolinone and perylene.

The suitable material for the polymer resins used in the polymer resin layer can be selected from thermoplastic polymer classes that include polyolefin, polyesters, polyamides, polycarbonates, cellulosic esters, polystyrene, polyvinyl resins, polysulfonamides, polyethers, polyimides, fluoro polymers, vinyl polymers and vinylidene polymers, polyurethanes, polyphenylenesulfides, polytetrafluoroethylene, polyacetals, polysulfonates, polyester ionomers, polyolefin ionomers, polymetacrylate, polymethylacrylate, polyethylacrylate.

Suitable polyolefins include polyethylene, polypropylene, polymethylpentene, polycyclohexylethylene, polyoctene, polynonene. Polyolefin copolymers, including copolymers of propylene and ethylene and mixture thereof such as hexene, butene and octene, cyclo-olefins and styrene are also useful. Other copolymers contains ethylene carbonmonoxide, styrene-acrylonitril, ethylene vinylacetate, acrylic acid, methacrylic acid and styrene-acrylonitril can also be selected.

Vinyl and vinylidene polymers are selected from polyvinylchloride, polyvinylidenechloride, polyvinylalcohol, polyvinylacetal, polyvinylbutyral, and copolymers like ethylene vinylalcohol.

Suitable fluoro polymers are polyvinyl fluoride, polyvinylidene fluoride, polytetrafluoroethylene, copolymer of ethylene tetrafluoroehtylene, polychlorotrifluoroethylene and its copolymers with ethylene or tetrafluoroethylene-hexafluoropropylene. The composition of the polymers used depends very much on the functional layer. Selection of polymers will be mainly based on enhancing the adhesive properties between the support and said functional layer, and achieving optimum condition for co-extrusion process.

The invention is now elucidated on the basis of the attached FIGS. 1 and 2. In FIG. 1, a co-extrusion line for laminating a support is shown. The support is fed via a number of rollers. Between the feeding roller and the cooling roll both the support and all layers of polymer melt including the photocatalytic containing layer are fed. The polymers are pressed by the niproll to the support which is cooled down by the cooling roll, and thereafter the laminated support is transported further.

In FIG. 2, a casting line for manufacturing the film sheet is shown. The melt polymer layers, including the photocatalyst layer, are fed onto the cooling roll. In order to lead the melted polymer onto the cooling roll, we may apply airknife or electrostatic pinning methodology. The film is thereafter transported further and it is ready for the lamination process.

The die used for feeding the melted polymers layer can be a multi-manifold die, or feed-block system or the combination of multi manifold and feed-block.

The present invention is further described with reference to the following examples, but it should be construed that the invention is in no way limited to those examples.

EXAMPLES

Example 1

The following sheet was made by a co-extrusion process.

Hopper 1 was filled with a fluoropolymer masterbatch containing 15 wt % $TiO_2$. The $TiO_2$ was purchased from Ishihara, type St-41, and the fluoropolymer from Dyneon, type THV 220G. Hopper 1 was connected to a 2.5 inch single screw extruder 1.

Hopper 2 was filled with LDPE which had a Melt Flow Index of 2 (DSM grade) and was connected to a 2.5 inch single screw extruder 2.

These 2 screw extruders were combined in a two layer feedblock/coathanger die. The extrusion temperature was 210° C. The arrangement of the layers was done as such that the polymer from hopper 2 resided on the surface of base paper and the content of hopper 1 formed the most upper layer. The support which was a 166 g/m2 base paper, was fed via a number of rollers at a speed of 30 m/min, and was corona treated before entering the nip. In the nip, the melt polymer was ozone treated and was pressed by the cooling roll onto the base paper. Thereafter, the laminated support was transported further for evaluation and for sample taking.

The thickness of each layers obtained from this experiment was 3 μm for the photocatalytic layer containing $TiO_2$ and 20 μm for the PE layer.

Measuring Method for the Photocatalytic Activity.

A square box, W×L×H=8.8 cm×19.0 cm×9.4 cm, was filled with 100 ml water solution of cyan anti-halation dye, which containing a pyrazolone derivative (Sankyo Chemicals-Japan). The concentration of the cyan dye solution in the box was 100 mg/L.

A photocatalytic sample with a surface area of 115 $cm^2$, was fixed on the bottom of the box. The box was then radiated with a 6 Watts UV lamp 9815 series from Cole Parmen. The radiated surface area of the liquid was 133 $cm^2$. The distance between the UV lamp and the surface of the liquid was 10.0 cm and that between the UV lamp and the surface of the photocatalytic sample was 12.5 cm. Under this condition, the cyan dye was decomposed by the photocatalytic film.

The concentration of the cyan dye was measured regularly by using UV/VIS spectro-photometer (Hewlett Packard 8453) at a wavelength of 645 nm. And the results are shown in table 1.

Example 2

Hopper 1 was filled with a fluoropolymer masterbatch containing 30 wt % photocatalyst grade $TiO_2$. The $TiO_2$ was purchased from Ishihara, type St-41, and the fluoropolymer from Dyneon, type THV 220G. Hopper 1 was connected to a 2.5 inch single screw extruder 1.

In hopper 2, a 60 wt % master batch of pigment grade $TiO_2$ in LDPE, was mixed together with fluoropolymer, THV and low density Polyethylene (LDPE) MFI-8 purchased from DSM in such away that the final concentration of pigment grade $TiO_2$ in the hopper was 30 wt %, the amount of fluoropolymer was 30 wt % and the concentration of LDPE was 40 wt %. Hopper 2 was connected to a 2.5 inch single screw extruder 2.

In hopper 3 LDPE MFI-8 from DSM was stored and this hopper was connected to a 4.5 inch single screw extruder 3.

These 3 screw extruders are combined in a three layer feedblock/coathanger die. The melt temperature is 210° C. The arrangement of the layers was done as such that the polymer from hopper 3 resided on the surface of base paper, the content of hopper 2 resided on the surface of polymer from hopper 3 and the content of hopper 1 formed the most upper layer. The support which was a 166 g/m2 base paper, was fed via a number of rollers at a speed of 200 m/min. and was corona treated before entering the nip. In the nip, the melt polymer was ozone treated and was pressed by the cooling roll onto the base paper. Thereafter, the laminated support is transported further for evaluation, and packaging.

The thickness of each layers obtained from this experiments was as follow:

layer 1, containing 30 wt % of photocatalyst grade $TiO_2$ and 70 wt % fluoropolymer: 0,5 μm
layer 2, containing 30 wt % of pigment grade TiO2, 30 wt % fluoropolymer and 40 wt % LDPE MFI-8: 3 μm
layer 3, containing LDPE MFI-8 only: 10 μm The photocatalytic activity of the sheet was measured according to the method mentioned in example 1 and the results are listed in table 1.

TABLE 1

| Time | Concentration of cyan dye in the box [%] | |
|---|---|---|
| [minutes] | Example 1 | Example 2 |
| 0 | 100 | 100 |
| 30 | 86 | 96 |
| 60 | 69 | 85 |
| 90 | 52 | 76 |
| 120 | 42 | 68 |
| 150 | 30 | 60 |
| 180 | 23 | 55 |
| 210 | 15 | 49 |

What is claimed is:

1. A photocatalytic sheet comprising:
   a support,
   a photocatalytic layer having a thickness of between 0.1 μm and 5 μm and comprising a particulate photocatalyst material and binder,
   and at least one functional layer wherein said functional layer is in between said support and said photocatalytic layer,
   wherein said photocatalytic layer and said functional layer are brought on the support using extrusion coating technology or casting technology.

2. The sheet of claim 1, further comprising one or more polymer resin layer(s) wherein said polymer resin layer or layers reside between the support and the said functional layer.

3. The sheet of claim 2 wherein said polymer resin is selected from thermoplastic polymers.

4. The sheet of claim 3 wherein said polymer resin is selected from the thermoplastic polymers that include polyolefin, polypropylene and polymethylpentene.

5. The sheet of claim 1, wherein co-extrusion technology is applied to extrude all said layers on the support.

6. The sheet of claim 1, wherein said support is a paper or polymeric film.

7. The sheet of claim 6, wherein said support is a polymeric film selected from the group consisting of triacetylcellulose, polyethyleneteraphthalate, polyethylenenaphthalate, polyamide and polypropylene.

8. The sheet of claim 1, wherein the total thickness of the photocatalytic sheet excluding the support is at least 10 μm.

9. The sheet of claim 1, wherein the functional layer comprises at least binders, polymer resins, extenders or fillers and pigments.

10. The sheet of claim 9 wherein said fillers or extenders are selected from the group of silicious particles, calcium carbonate, $TiO_2$, hydrated aluminum oxide and mixtures thereof.

11. The sheet of claim 9 wherein said pigments are selected from the group of $TiO_2$, zinc oxide, zinc sulfate, iron oxide pigments, ultramarine pigments, blue iron pigments, azo pigments, copper phthalocyanine, isoindolinone, perylene and mixtures thereof.

12. The sheet of claim 1, wherein said photocatalyst material is an oxide selected from the group consisting of $SrTiO_3$, $TiO_2$, $ZnO$, $SnO_2$, $WO_3$, $Fe_2O_3$ and $Bi_2O_3$.

13. The sheet of claim 1, wherein said photocatalyst material comprises the anatase form of $TiO_2$.

14. The sheet of claim 1, wherein said photocatalytic layer contains a photocatalyst in an amount between 10 and 90 wt %.

15. The sheet of claim 14, wherein said photocatalytic layer contains a photocatalyst in an amount between 20 and 80 wt %.

16. The sheet of claim 1, wherein said photocatalytic layer contains said binder in the range between 10 and 90 wt %.

17. The sheet of claim 16, wherein said photocatalytic layer contains said binder in the range between 20 and 80 wt %.

18. The sheet of claim 1, wherein the thickness of said photocatalytic layer lies between 0.1 μm and 2.0 μm.

19. The sheet of claim 1, wherein the thickness of said photocatalytic layer lies between 0.3 μm and 1.0 μm.

20. The sheet of claim 1 wherein said binder is a polymer based on any combination of monomers selected from the group of tetrafluoroethylene, vinylenedifluoro-, hexafluoropropylene, perfluorovinylether and mixtures thereof.

21. Process for the manufacture of a photocatalytic sheet according to claim 1, said photocatalytic sheet comprising a support, a photocatalytic layer comprising photocatalyst materials and binder, and at least one functional layer wherein said functional layer is in between said support and said photocatalytic layer, wherein said photocatalytic layer and said functional layer are brought on the support using extrusion coating technology or casting technology.

22. The sheet of claim 1, wherein said photocatalytic layer and said functional layer are brought on the support without the use of solvent.

23. A photocatalytic film comprising:

a photocatalytic layer having a thickness of between 0.1 μm and 5 μm and comprising a particulate photocatalyst material and binder, and at least one functional layer, wherein said film is formed by applying casting technology.

24. The film of claim 23, further comprising one or more polymer resin layer(s) wherein said functional layer resides between the said polymer resin layer and the said photocatalytic layer.

25. The film of claim 23, wherein the thickness of said photocatalytic layer is between 0.1 and 2.0 μm.

26. The film of claim 23, wherein the thickness of said photocatalytic layer is between 0.3 and 1.0 μm.

27. The film of claim 23, wherein the functional layer comprises at least binders, polymer resins, extenders or fillers and pigments.

28. The film of claim 27 wherein said fillers or extenders are selected from the group of silicious particles, calcium carbonate, $TiO_2$, hydrated aluminum oxide and mixtures thereof.

29. The film of claim 27 wherein said pigments are selected from the group of $TiO_2$, zinc oxide, zinc sulfate, iron oxide pigments, ultramarine pigments, blue iron pigments, azo pigments, copper phthalocyanine, isoindolinone, perylene and mixtures thereof.

30. The film of claim 23, wherein said photocatalyst material is an oxide selected from the group consisting of $SrTiO_3$, $TiO_2$, $ZnO$, $SnO_2$, $WO_3$, $Fe_2O_3$ and $Bi_2O_3$.

31. The film of claim 23, wherein said photocatalyst material comprises the anatase form of $TiO_2$.

32. The film of claim 23, wherein said photocatalytic layer contains a photocatalyst in an amount between 10 and 90 wt %.

33. The film of claim 23, wherein said photocatalytic layer contains said binder in the range between 10 and 90 wt %.

34. The film of claim 23, wherein said photocatalytic layer contains a photocatalyst in an amount between 20 and 80 wt %.

35. The film of claim 23, wherein said photocatalytic layer contains said binder in the range between 20 and 80 wt %.

36. The film of claim 23 wherein said binder is a polymer based on any combination of monomers selected from the group of tetrafluoroethylene, vinylenedifluoro-, hexafluoropropylene, perfluorovinylether and mixtures thereof.

37. Process for the manufacture of a photocatalytic film comprising a photocatalytic layer having a thickness of between 0.1 μm and 5 μm and comprising photocatalyst materials and binder, and at least one functional layer, wherein said film is formed by applying casting technology.

38. The process of claim 37, further comprising laminating the sheet onto a support.

* * * * *